Jan. 15, 1924.
E. HAFER
COUPLING
Filed Sept. 14, 1922
1,480,757
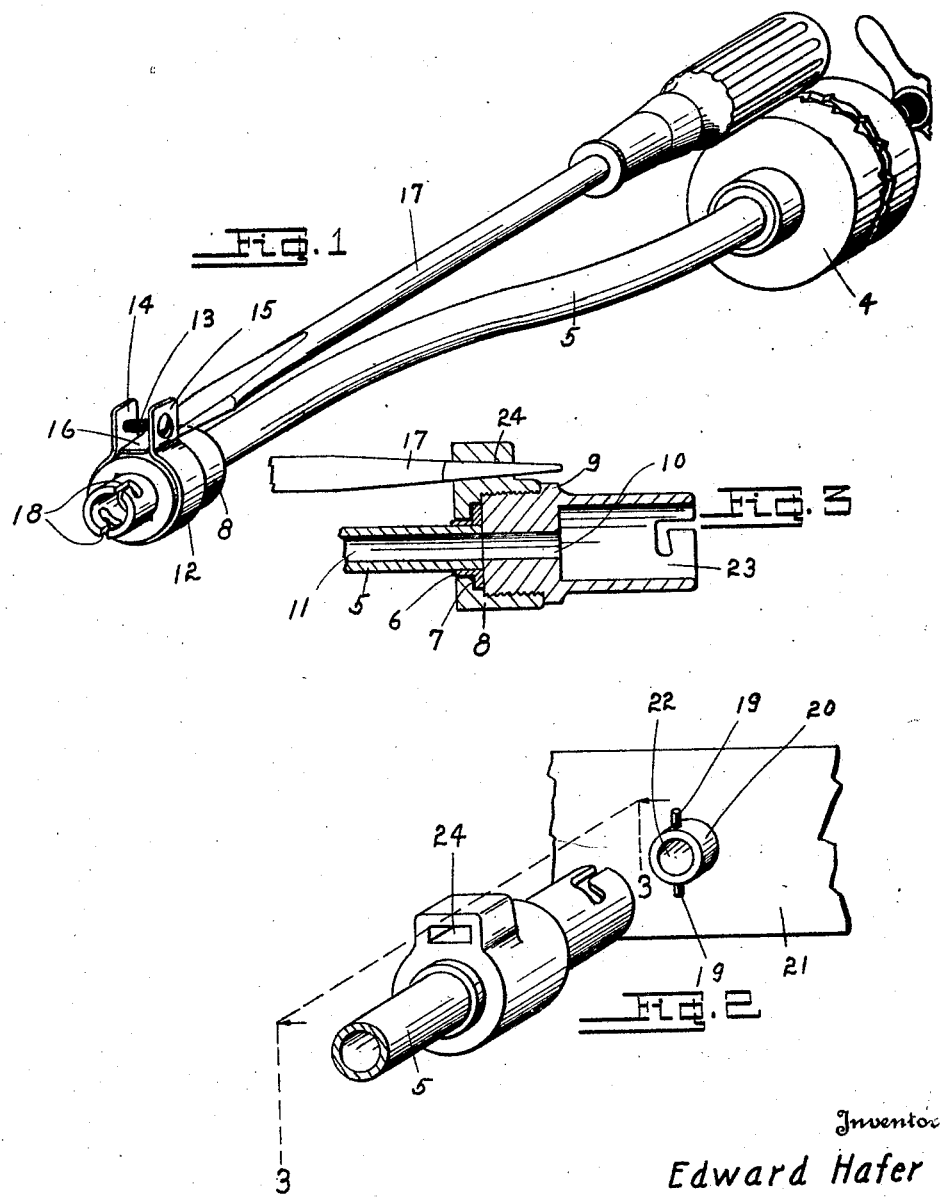
Inventor
Edward Hafer
By Walter F. Murray
Attorney Patented Jan. 15, 1924.

1,480,757

UNITED STATES PATENT OFFICE.

EDWARD HAFER, OF CINCINNATI, OHIO.

COUPLING.

Application filed September 14, 1922. Serial No. 588,237.

*To all whom it may concern:*

Be it known that I, EDWARD HAFER, a citizen of the United States of America, and a resident of Cincinnati, in the county of Hamilton and State of Ohio, have invented a new and useful Improvement in a Coupling, of which the following is a specification.

An object of my invention is to provide a coupling such as is used on grease guns for lubricating automobile parts, adapted to receive a removable member employed in attaching the coupling.

Another object of my invention is to provide a simple and efficient device for the purpose stated.

These and other objects are attained by means described herein and disclosed in the accompanying drawing in which:

Fig. 1 is a perspective view of a coupling embodying my invention.

Fig. 2 is a perspective view of a modified form of coupling embodying my invention.

Fig. 3 is a sectional view on line 3—3 of Fig. 2.

The grease gun 4 carries a flexible tube 5. The flexible tube 5 carries a ring 6 having an annular flange 7, which may be integral with the tube 5, and on the ring 6 is mounted a collar 8 carrying a sleeve 9. The sleeve 9 has an axial bore 10 which registers with the bore 11 of the tube 5. Any other suitable means for rotatably mounting the sleeve 9 upon the end of the tube 5 may be employed. The collar 8 has mounted on it a clamp 12 such as is generally used to secure garden hose and the like upon hose couplings, the clamp being provided with a screw 13 spaced from the collar and serving to draw the lugs 14 and 15 of the clamp toward one another. The space between the screw 13 and the collar 8 is made sufficient to accommodate the tapered end 16 of a screw driver or similar instrument 17. The sleeve 9 has bayonet slots 18 formed in it adapted to receive pins 19 formed on the neck 20 extending from the housing or casing 21 containing the mechanism to be lubricated. The neck 20 has an axial bore 22 with which the bore 10 in the sleeve registers when the neck 20 is lodged in the enlarged bore 23 in the sleeve.

In Fig. 2 the collar 8 is provided with a tapered bore 24 adapted to receive an instrument such as the screw driver 17, thereby dispensing with clamp 12 and effecting an integral structure which provides a tapered seat to receive the tool 17.

The operation of my device is as follows:

The necks 20 on the various housings 21, for various automobile mechanisms are many times located in rather inaccessible places, wherefore to connect the tube 15 with such necks is a tedious, dirty and awkward proceeding. By employing a device embodying my invention the tool 17 may be mounted in a tapered seat formed between the screw 13 and the collar, as shown in Fig. 1, or in the seat 24, shown in Fig. 2, at the time when the operator first brings the coupling into engagement upon the neck 20, after which the instrument 17 may be rotatably actuated about the axis of the tube 5, thereby lodging the pins 19 in the transverse portions of the bayonet slots 18 and securing the coupling upon the housing 21. The coupling may be disconnected by using the instrument 17 and reversing the movement thereof in order to disengage pins 19 from the bayonet slots 18.

What I claim is:

1. In a device of the class described the combination of a tube, and a coupling revolubly mounted on the tube, the coupling being provided with a seat extending in substantial parallelism with the axis of the tube at the place of mounting of the coupling on the tube, the seat having walls converging toward the free end of the coupling.

2. In a device of the class described, the combination of a tube, and a coupling revolubly mounted on the tube, the coupling being provided with a seat for receiving the end of a screw driver for imparting rotation to the coupling.

In testimony whereof, I have hereunto subscribed my name this 12th day of September, 1922.

EDWARD HAFER.